Patented Oct. 30, 1951

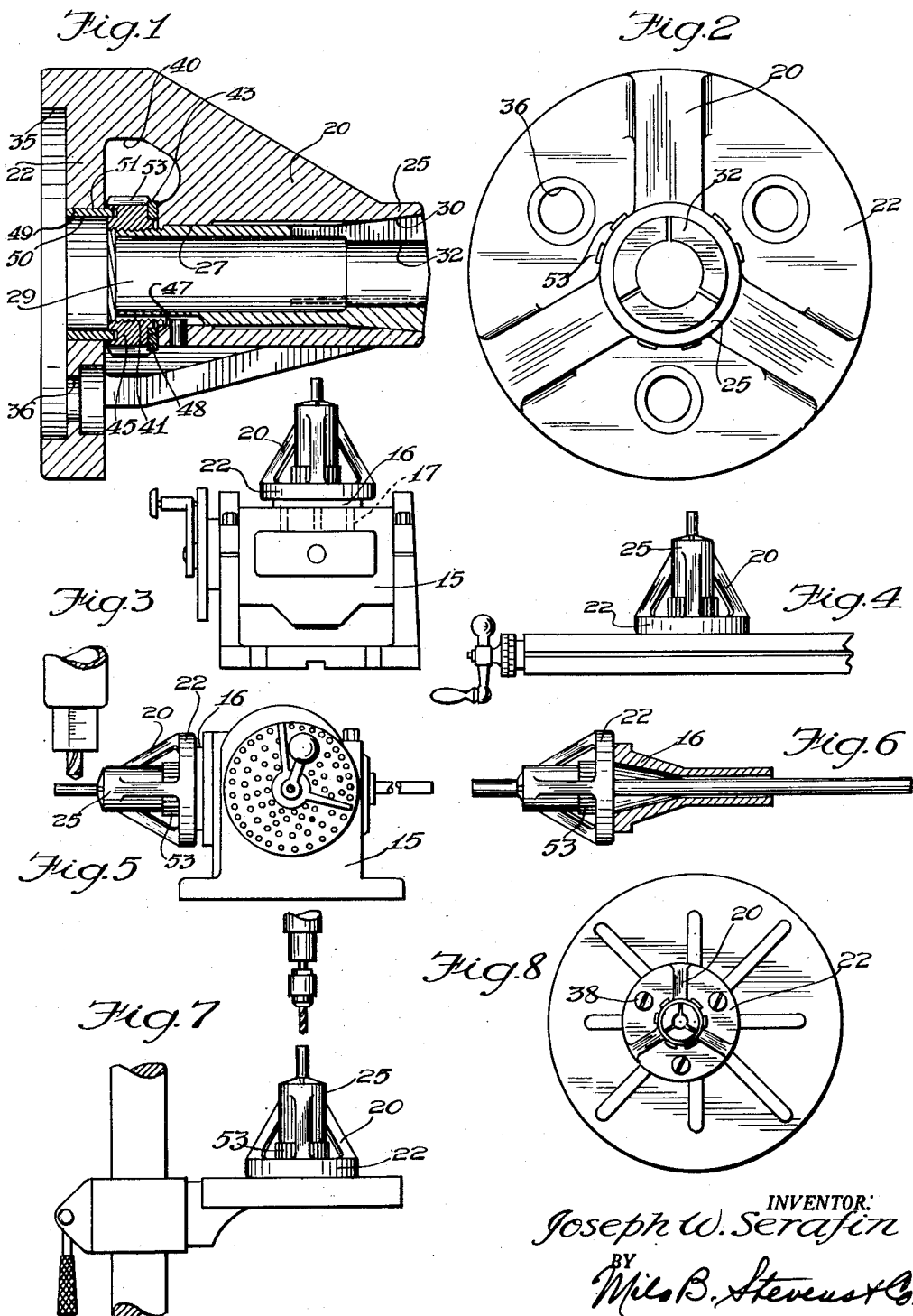

2,572,890

UNITED STATES PATENT OFFICE 2,572,890

EXTENDED COLLET HOLDER FOR MILLING MACHINE DIVIDING HEADS

Joseph W. Serafin, Chicago, Ill.

Application January 25, 1950, Serial No. 140,379

4 Claims. (Cl. 279—52)

My invention relates to collet holders for the dividing heads of milling machines, and one of its objects is to provide a holder which is constituted to keep smaller work out and away from the usual chuck, whereby to make possible a closer approach to the milling machine spindle.

A further object is to provide a collet holder which can be turned to vertical position, such an adjustment ordinarily not being possible with conventional types of adapters because of nuts or drawbar wheels in the back of the dividing head which prevent up to a 90 degree swing of the head.

A still further object is to provide a holder of the above character which eliminates the need of nuts or hand wheels at the rear of the dividing head for the purpose of drawing in the collet.

Another object is to construct a collet holder which does not engage into the spindle of the dividing head, so that where the work is long and slender it can be run through the hole in the dividing head.

An additional object is to design the novel collet holder with features of construction which render it highly efficient mechanically and functionally, and adaptable to various machine and tool room uses.

With the above objects in view, and any others which may suggest themselves from the description to follow, a better understanding of the invention may be had by reference to the accompanying drawing, in which—

Fig. 1 is a longitudinal section of the holder;

Fig. 2 is a front end view thereof;

Fig. 3 is an elevation, showing the holder mounted in vertical position on a milling machine dividing head;

Fig. 4 is a side view showing the holder similarly mounted on a milling machine table;

Fig. 5 is a side view showing the holder mounted in the horizontal position on a milling machine dividing head;

Fig. 6 is a similar view showing the position of the dividing head spindle in relation to the holder while a long piece of work is being held;

Fig. 7 is a side view showing the holder mounted for holding work in a drill press; and Fig. 8 is a front view showing the holder clamped off-center on the face plate of a lathe for eccentric work.

In accordance with the foregoing, specific reference to the drawing shows a typical milling machine dividing head at 15 and its spindle at 16; and the latter is bored with tapped holes 17 to which access is had from the front.

The collet holder 20 is generally of pyramidal form, having a circular base 22 and its cluster of three webs 20 converging forwardly to form a tubular socket 25. The webs form a center bearing 27 for the collet 29; and the socket 25 is flared as indicated at 30 to seat the head 32 of the collet.

The base 22 is counterbored at 35 from the rear to receive the front end of the dividing head spindle 16 when the holder is applied, the base having holes 36 registering with the spindle holes 17 for the application of bolts 38 to attach the holder to the dividing head.

A cavity 40 occurs in the holder between the inner portions of the webs 20 and the base 22, the threaded rear end 41 of the collet projecting into such cavity from an abutment 43 formed by the webs.

A spanner-type nut 45 is positioned in front of the holder base 22 and threaded on the rear end portion of the collet; and the front end of the nut is annularly recessed at 47 to seat a fibre washer 48 located between the nut and the abutment 43. It is now apparent that the rotation of the nut in the feeding direction will draw rearwardly on the collet with the effect of engaging the work.

The base 22 has a central opening 49 opposite the nut 45 into which is driven a ring 50. The front end of the latter projects into a circular channel 51 made in the rear face of the nut. It is now apparent that the ring 50 forms a centering support for the nut before and during the time that the collet is inserted in the holder; and access is of course had to the peripheral ribs 53 of the nut at points between the webs of the holder for the rotary adjustment of the nut.

It is now apparent that the novel collet holder places the zone in which the work is held well forward of the dividing head, and the pyramidal form of the holder renders it compact and well suited for smaller work. Thus, Fig. 5 shows the holder in the normal or horizontal position, where the work is held farther away from the dividing head and in a position to clear such obstructions as chucks, large diameter machine spindles, etc. Yet the work is held more securely because of the unitary bearing afforded by the holder. On the other hand, where the work is designed to be held in the vertical position, the dividing head may be turned to position the holder accordingly, as shown in Fig. 3. Also, the holder may be readily bolted or clamped to a milling machine table as shown in Fig. 4, on the bed of a drill press as shown in Fig. 7, or off-center on the face plate of a lathe as shown in Fig. 8 to project the work more conveniently or accessibly. The back surface of the holder is ground finished to make these applications possible and insure squareness of contact. Moreover, since the holder does not engage into the spindle of the dividing head, it leaves the bore of the spindle clear to receive long and slender work, as indicated in Fig. 6. Further, because of the compact application of the holder to the dividing head the latter can be swung through 90 degrees from the normal or horizontal position to a vertical one. Further, since the holder has a self-contained adjusting nut, it eliminates the need of nuts or hand wheels at the rear end of the dividing head for the purpose of drawing in the collet and the hazard that such nuts or hand wheels may interfere with the free swing of the dividing head in case its rotary adjustment is desired. Further, the supporting ring at the rear of the nut 45 also keeps the nut centered and prevents the cross-threading of the collet; and the ring also serves to retain the nut against misplacement or loss after the collet has been withdrawn. Further, the holder is suitable for receiving a common, lathe type of collet, of which a good supply usually exists in every tool room, affording the use of a wide variety of collet sizes. Finally, the holder is of compact design and rugged construction, making for economy in its manufacture and durability while in use.

While I have described the invention along specific lines, various minor changes or refinements may be made therein without departing from its principles, and I reserve the right to employ all such changes and refinements as may come within the scope and spirit of the appended claims.

I claim:

1. An extended collet holder for a rotary support comprising a base attachable in forward relation to the support, and a forward projection of the base centered on the axis of the support, said projection being formed as a socket for the collet, said socket having a rear abutment spaced from the base, the threaded shank of the collet extending rearwardly from said abutment, a nut between the latter and the base adapted to thread on said shank and operable to adjust the collet, and means to lock the nut from endwise travel.

2. An extended collet holder for a rotary support comprising a base attachable in forward relation to the support, and a forward projection of the base centered on the axis of the support, said projection being formed as a socket for the collet, said socket having a rear abutment spaced from the base, the threaded shank of the collet extending rearwardly from said abutment, a nut between the latter and the base adapted to thread on said shank and operable to adjust the collet, and means to center the nut in relation to the support.

3. An extended collet holder for a rotary support comprising a base attachable in forward relation to the support, and a forward projection of the base centered on the axis of the support, said projection being formed as a socket for the collet, said socket having a rear abutment spaced from the base, the threaded shank of the collet extending rearwardly from said abutment, a nut between the latter and the base adapted to thread on said shank and operable to adjust the collet, and means to center the nut in relation to the support, such means comprising a ring in said base centered with the support and seating around an annular formation of the nut.

4. An extended collet holder for a rotary support comprising a base attachable in forward relation to the support, and a forward projection of the base centered on the axis of the support, said projection being formed as a socket for the collet, said socket having a rear abutment spaced from the base, the threaded shank of the collet extending rearwardly from said abutment, a nut between the latter and the base adapted to thread on said shank and operable to adjust the collet, and means to center the nut in relation to the support, such means comprising a ring in said base centered with the support, the ring projecting with its forward end into an annular groove in the rear face of the nut.

JOSEPH W. SERAFIN.

REFERENCES CITED

The following references are of record in the file of this patent:

UNITED STATES PATENTS

| Number | Name | Date |
|---|---|---|
| 1,260,130 | Bemis | Mar. 19, 1918 |
| 1,428,100 | Kahl | Sept. 5, 1922 |
| 2,393,140 | Bugg | Jan. 15, 1946 |
| 2,429,617 | Gustafron | Oct. 28, 1947 |
| 2,431,594 | Wernig | Nov. 25, 1947 |
| 2,434,600 | Swenson | Jan. 13, 1948 |